United States Patent [19]

Lindsay

[11] Patent Number: 5,605,101

[45] Date of Patent: Feb. 25, 1997

[54] TILTABLE PAYLOAD MOUNTING

[75] Inventor: Richard A. Lindsay, Eye, United Kingdom

[73] Assignee: Vitec Group, PLC, Bury St. Edmunds, United Kingdom

[21] Appl. No.: 367,283

[22] PCT Filed: Sep. 15, 1993

[86] PCT No.: PCT/GB93/01948

§ 371 Date: Jan. 12, 1995

§ 102(e) Date: Jan. 12, 1995

[87] PCT Pub. No.: WO94/07080

PCT Pub. Date: Mar. 31, 1994

[30]   Foreign Application Priority Data

Sep. 15, 1992 [GB] United Kingdom ............... 9219525

[51] Int. Cl.$^6$ ........................................ A47F 5/12
[52] U.S. Cl. ........................... 108/7; 108/2; 108/8
[58] Field of Search ................... 108/1, 2, 7, 8

[56]   References Cited

U.S. PATENT DOCUMENTS 2,845,263  7/1958  Gund .

FOREIGN PATENT DOCUMENTS 2717772  10/1978  Germany .
2952660  2/1981   Germany .
3908682  10/1990  Germany .
2049601  12/1980  United Kingdom .
2080406  2/1982   United Kingdom .
2102757  2/1985   United Kingdom .
2190703  11/1987  United Kingdom .
2231548  11/1990  United Kingdom .

Primary Examiner—Peter R. Brown
Assistant Examiner—Anthony D. Barfield
Attorney, Agent, or Firm—Kenyon & Kenyon

[57]   ABSTRACT

A tiltable mounting for a payload includes a base (10), a support member (15) for supporting the payload thereon, the support member being tiltable about a horizontal axis (14) on the base for tilting about each side of a top dead center position about said horizontal axis, and a torque generating mechanism (17) mounted on the base and acting on the tiltable support to generate a torque in response to tilting of the support equal and opposite to the out of balance moment of the support with its payload to hold the support balanced in any position of movement about said axis. A plurality of torque generating units (20, 21) are provided each generating a torque which varies sinusoidaly with displacement, and a mechanism (22, 23, 31, 32, 35, 36, 37) provided for adjusting the phase angle between the torque generating means to vary the collective amplitude of the torque generating mechanism to suit the weight of the payload on the support member.

11 Claims, 4 Drawing Sheets

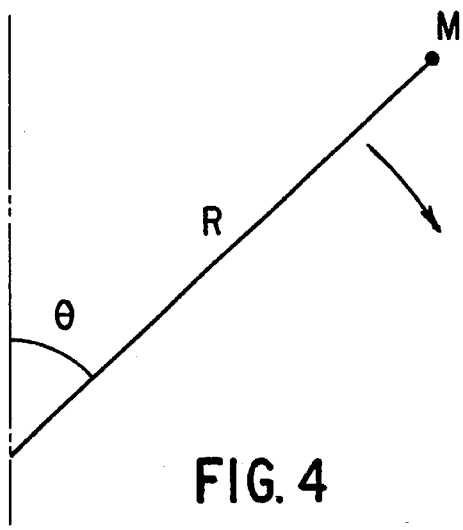
FIG. 4
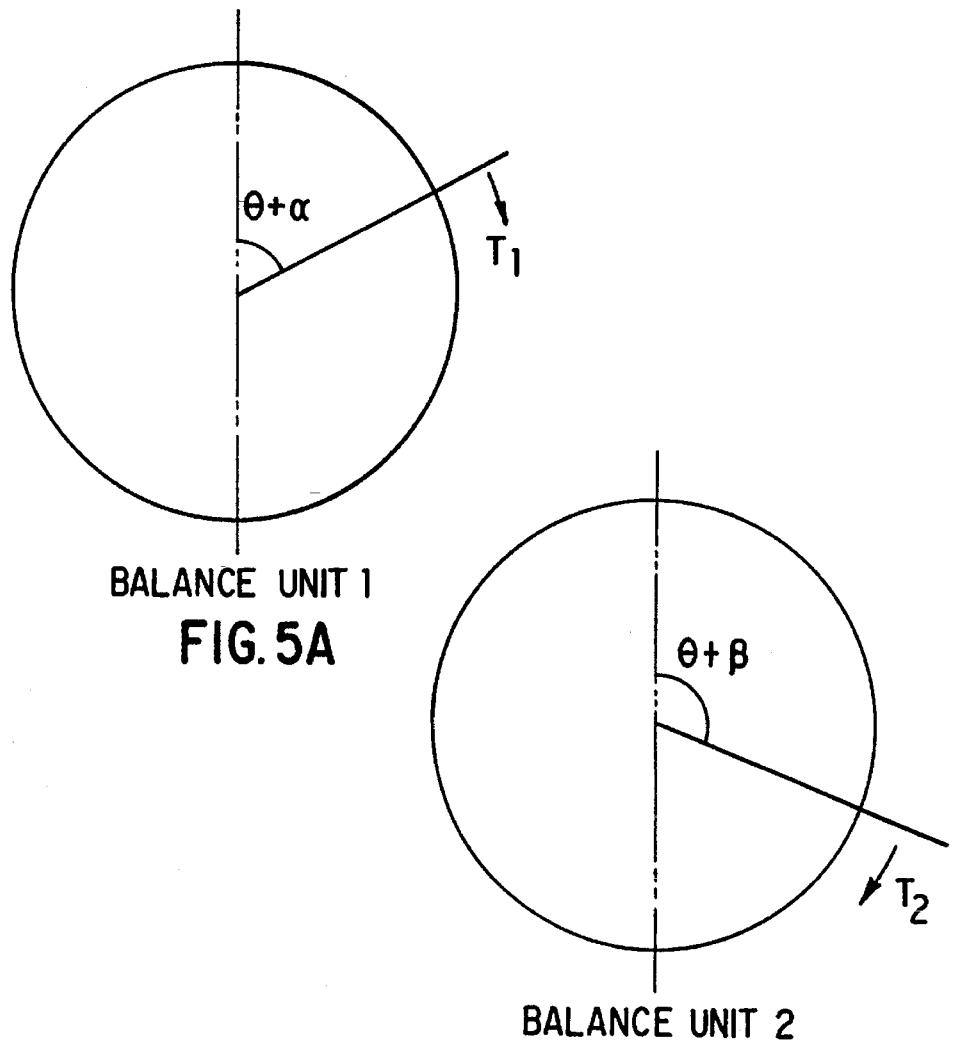
BALANCE UNIT 1
FIG. 5A
BALANCE UNIT 2
FIG. 5B

TILTABLE PAYLOAD MOUNTING

This invention relates to a tiltable mounting for supporting a payload and is particularly although not exclusivcely applicable to tiltable mountings for supporting articles such as television, cinematograph or video cameras to enable the camera to be tilted about a horizontal axis in a required position of adjustment and automatically to remain balanced in any position to which it is moved.

GB-A-2231548 discloses a mechanism for balancing the weight of an object to be swivelled about an axis and especially for balancing the weight of a film or television camera mounted on a tripod head. The pitching torque produced during swivelling of the object is compensated by a restoring torque which acts with the aid of a spring arrangement on the pitch axis via a lever arm. Provision is made for increasing the pitching range and achieving a compensating torque for all pitch angles. In order to cater for cameras of different weights, an appropriate choice of spring strength has to be made and bolts have to be adjusted to provide the requisite degree of precompression in the springs.

GB-A-2049601 discloses a torque counterbalancing mechanism for use on tiltable tables, the mechanism comprising a cam operated on by a spring loaded cam follower so their interaction produces a force equal opposite to the torque generated as the tiltable table with load rotates to either side of the vertical. At the null position, i.e. no torque, the spring is at rest with no prestressing and means are provided for changing the effective weight of the spring to adjust the mechanism to accommodate different heights of the centre of gravity of the load or changes in load. Further more complex arrangements for achieving similar effects are shown in GB-A-2080406, GB-A-2190703 and DE-A-2711772.

It is an object of the present invention to provide a counterbalancing arrangement for a tiltable mounting supporting a payload which is readily and simply adjustable to cater for different payload weights and which at the same time provides perfect compensation for the tiltable mounting throughout its range of movement.

This invention provides a tiltable mounting for a payload comprising a base, a support member for supporting the payload thereon, the support member being tiltable about a horiztonal axis on the base for tilting about each side of a top dead centre position about said horizontal axis, and torque generating means mounted on the base and acting on the tiltable support to generate a torque in response to tilting of the support equal and opposite to the out of balance moment of the support with its payload to hold the support balanced in any position of movement about said axis, wherein a plurality of torque generating means are provided each generating a torque which varies sinusoidaly with displacement, means being provided for adjusting the phase angle between the torque generating means to vary the collective amplitude of the torque generating means to suit the weight of the payload on the support member.

Preferably means are also provided for adjusting the torque generating means in the same direction with respect to the mounting to compensate for off-centre location of the load when the support member is in the top dead centre position.

The following is a description of a specific embodiment of the invention, reference being made to the accompanying drawings in which;

FIG. 4 represents a diagram depicting the combined mass of the camera and mounting rotating about an angle from the vertical.

FIGS. 5A and 5B represent diagrams depicting two torque balancing units.

Figure 1:
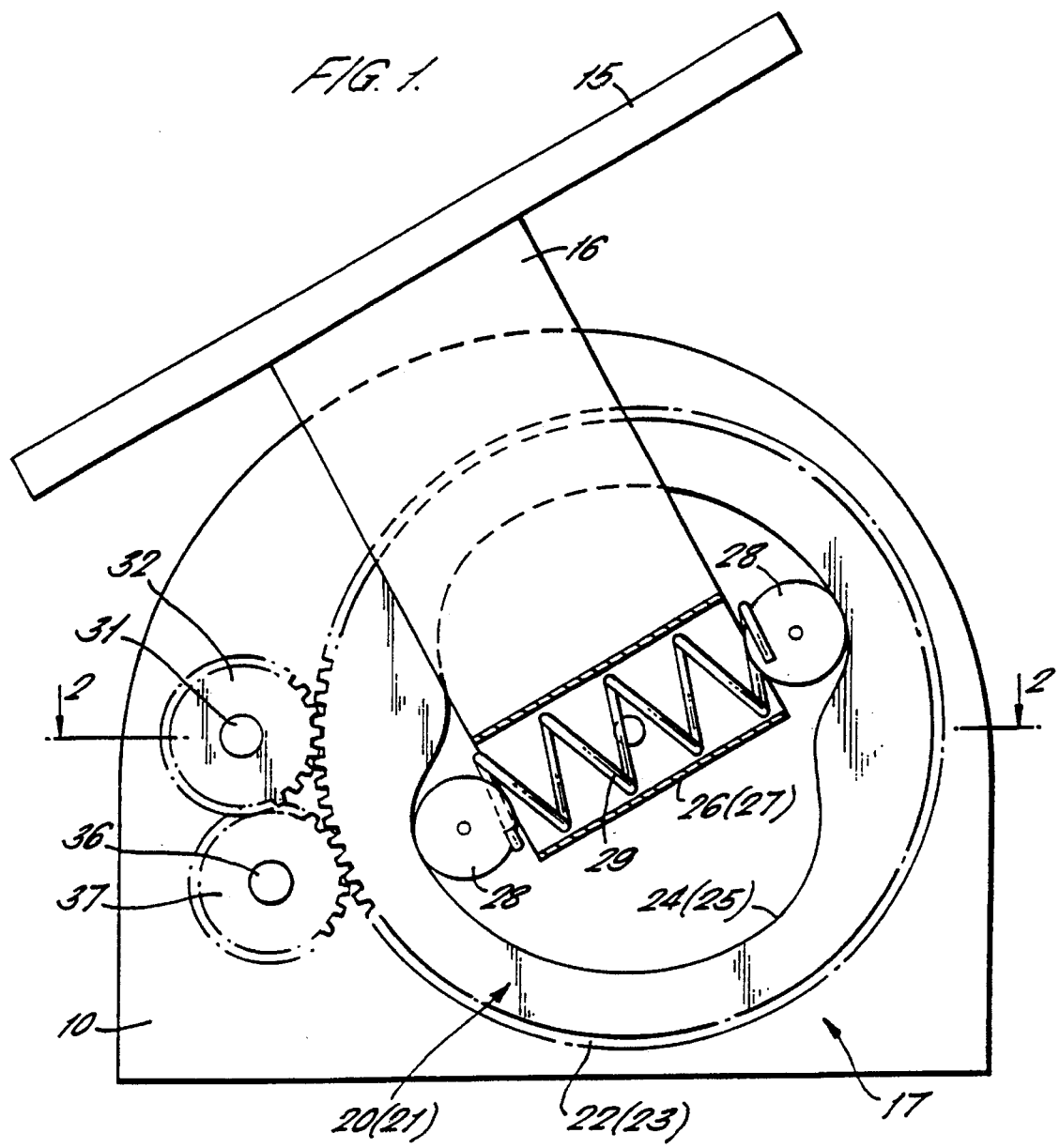
FIG. 1 is a partly cut-away elevation view of a tiltable camera mounting embodying an automatic counter-balancing mechanism.

The drawings show a tiltable mounting for a T.V., video or cinematagraph camera comprising a base 10 in the form of an upstanding enclosure having spaced side walls 11. A pair of stub-shafts 12, 13 are rotatably mounted about a common axis 14 in the side walls.

A platform 15 for receiving the camera is mounted on a pair of dependent legs 16 secured to the ends of the stub-shafts projecting from the side walls to support the platform for tilting movement about the axis 14.

The camera/mounting assembly is thus tiltable from the top dead centre position in which the platform is horizontal about the horizontal axis 14 in either direction. A torque generating counter balancing mechanism indicated at 17 is provided in the housing of the base which acts in response to tilting of the assembly automatically to support the assembly in any position of adjustment to which it is moved about the horizontal axis. Before the specific mechanical arrangement of the torque balancing mechanism is described, the geometry on which the arrangement is based will be described.

FIG. 4 represents, in simplified form, the combined mass of the camera and mounting rotating about a radius R generating an angle $\theta$ from the vertical.

The out-of-balance torque $T = MR \sin \theta$

Assume that two torque balancing units are provided as depicted in FIGS. 5A and 5B.

The torque produced by the respective balance units will be given by the following equations:

$$T_1 = \frac{MR}{2} \sin(\theta + \alpha) \quad (1)$$

(where $\alpha$ is phase angle)

$$T_2 = \frac{MR}{2} \sin(\theta + \beta) \quad (2)$$

(where $\beta$ is phase angle)

With the two balance units acting in parallel, the resulting total torque will be given by the following equation:

$$\text{Total torque} = T_1 + T_2 \frac{MR}{2} (\sin(\theta + \alpha) + (\theta + \beta))$$

$$= \frac{MR}{2} \cdot 2 \sin\left(\frac{2\theta + \alpha + \beta}{2}\right) \cos\left(\frac{2 - \beta}{2}\right)$$

$$T_r = MR \underbrace{\sin\left(\theta + \left[\frac{\alpha + \beta}{2}\right]\right)}_{\text{overall phase}} \underbrace{\cos\left(\frac{\alpha - \beta}{2}\right)}_{\text{overall amplitude}}$$

Thus a pair of torque generating means operating in parallel and each of which varies sinusoidally with angular displacement can be used collectively to provide the total torque required. By adjusting the phase angle between the torque generating means, the collective amplitude and phase of the torque generating means can be varied according to the magnitude and location of the payload on the pivotal mounting.

Referring again to FIGS. 1 to 3 of the drawings an example of a suitable form of torque generating means which may be employed in the invention is indicated at 17. The torque generating means comprises a pair of torque generating units 20, 21 each of which comprises a gear wheel 22, 23 having an internal sinusoidally shaped cam surface 24, 25. Each gear wheel encircles and is supported for rotation on a cylindrical housing 26, 27 mounted on the respective ends of stub-shafts 12, 13 within the enclosure 10. Each housing is of the hollow cylindrical open ended form and has rollers or balls 28 spring loaded by a spring 29 extending through the housing to project from either end and engage the encircling cam surface 24, 25 of the respective gear wheel.

It will be appreciated from the shape of the cam surface 24, 25 that rotation of the housing 26, 27 with the respective stub-shaft 12, 13 will cause the rollers 28 to compress and release the springs 29 resulting in a torque which resists rotation of the housing and which varies sinusoidally with rotation of the housing.

A drive mechanism for rotating the gear wheels 22, 23 in the same or opposite directions as required is indicated at 30 on FIGS. 2 and 3 to which reference will now be made. The drive mechanism comprises a main drive shaft 31 mounted for both and rotation and axial movement in the enclosure 10. The shaft has a pair of spaced pinions 32 fixed thereon which engage external gear teeth 22, 23 on the respective gear wheels to provide a driving connection with the gear wheels. One end of the shaft 31 projects from the housing and carries a knob 35 for effecting rotation/axial movement of the shaft by hand. A lay shaft 36 is mounted in the housing parallel to the drive shaft and carries a single pinion 37 engageable with the teeth of one of the gear wheels 23. The pinion 37 is relatively long and is partially off-set from the gear wheel 23 with which it engages so that one of the pinions 32 on drive shaft 31 is selectively engageable by axial adjustment of the drive shaft with gear 23 either direct or via pinion 37 on the lay shaft whilst the other pinion 32 is permanently engaged with its gear wheel 22.

Figure 2:
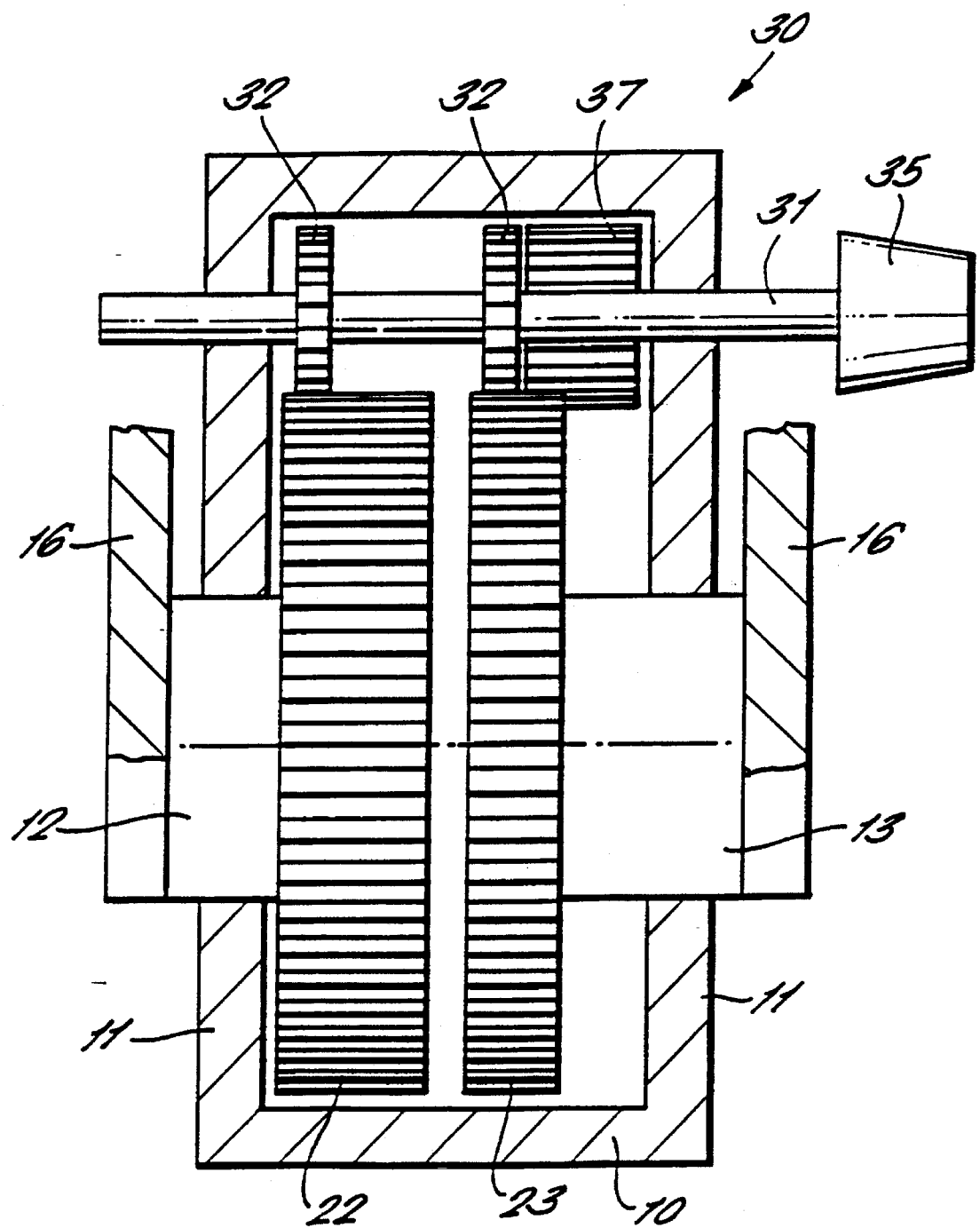
FIG. 2 is a section on the line 2—2 on FIG. 1 with the counter-balancing mechanism in one mode of operation.
Figure 3:
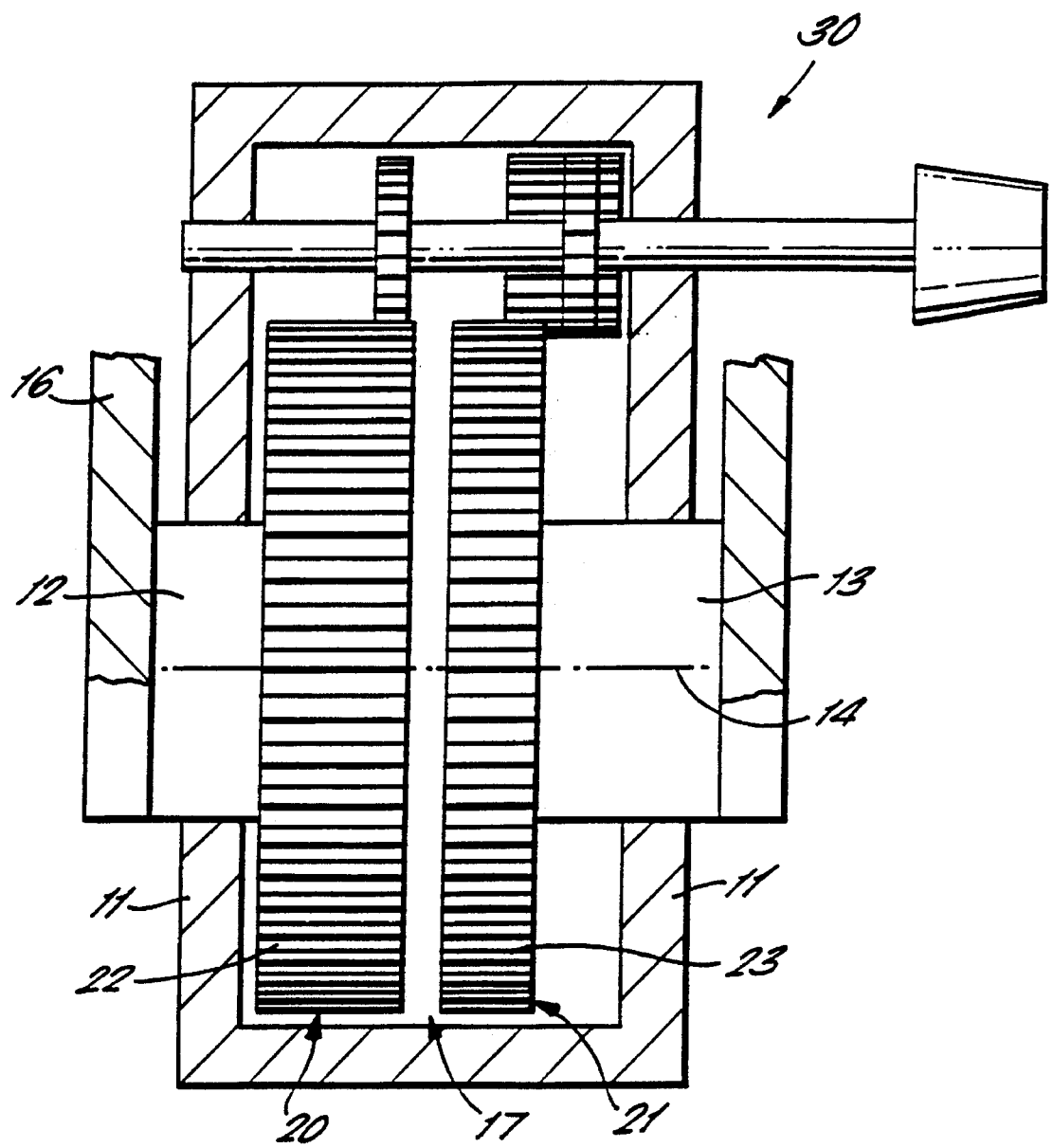
FIG. 3 is a similar view to FIG. 2 with the counter-balancing mechanism in another mode of operation.

As shown in FIG. 2, the drive shaft 31 rotates both gear wheels in the same direction and, as indicated above, this enables the torque generating means to be adjusted to compensate for an offset payload on the tiltable mounting when the latter is in its top dead centre position. With the drive shaft in the position shown in FIG. 3, the cam gears are rotated in opposite directions to vary the amplitude of the collective torque provided by the two torque generating means to cater for different sizes of payloads on the mounting.

Thus the arrangement according to the invention provides a convenient and relatively simple means for providing a fully automatic counter balancing mechanism for a camera or other payload mounted on a tiltable mounting.

I claim:

1. A tiltable mounting for a payload comprising a base, a support member for supporting the payload thereon, the support member being tiltable about a horizontal axis on the base for tilting about each side of a top dead center position about said horizontal axis, and torque generating means mounted on the base and acting on the tiltable support member to generate a torque in response to tilting of the support member equal and opposite to an out of balance moment of the support member to hold the support member balanced in any position of movement about said axis, wherein the improvement comprises a plurality of rotary torque generating devices, each generating a torque which varies sinusoidally with rotational displacement, and means are provided for adjusting the phase angle between the torque generating devices to vary the collective amplitude of the resulting torque generated to suit the weight of the payload on the support member.

2. A tiltable mounting as claimed in claim 1, wherein means are provided for adjusting the angular relationship of the torque generating devices with respect to the support member to compensate for off-center location of the load when the support member is in the top dead center position.

3. A tiltable mounting as claimed in claim 2, wherein two torque generating means are provided each of which provides a sinusoidally varying output and drive means are provided for selectively adjusting the torque generating devices in opposing directions to vary the total amplitude of the torque provided and in the same direction to vary the phase angle of total torque with respect to displacement of the torque generating means to compensate for off-center location of the payload on the support member in the top dead center position.

4. A tiltable mounting as claimed in claim 3, wherein each torque generating device comprises an annular reaction member having an annular cam surface and a rotary cam follower coupled to the tiltable support member and embodying means to generate a resistance to rotation which varies with movement of the follower over the cam surface, said drive means being arranged to rotate the annular reaction members in opposite directions to vary the total torque provided and in the same direction to vary the phase angle of the total torque provided.

5. A tiltable mounting as claimed in claim 4, wherein the rotary cam follower comprises a rotary hub on which a follower element is spring mounted to engage with the cam surface so that, as the cam follower rotates with respect to the reaction member, the spring stress varies to provide a sinusoidally varying resistance to rotation of the follower determined by a shape of the cam surface.

6. A tiltable mounting as claimed in claim 5, wherein the rotary hub of the cam follower comprises a hollow cylindrical housing having rolling elements spring loaded outwardly by bias spring means from either end to engage the annular cam surface.

7. A tiltable mounting as claimed in claim 6, wherein the rolling elements are supported and spring loaded outwardly by a coil spring extending through the housing.

8. A tiltable mounting as claimed in claim 6, wherein the annular reaction members have gear teeth around their outer peripheries and the drive means for the members comprises a reversible gear drive mechanism.

9. A tiltable mounting as claimed in claim 5, wherein the annular reaction members have gear teeth around their outer peripheries and the drive means for the members comprises a reversible gear drive mechanism.

10. A tiltable mounting as claimed in claim 4, wherein the annular reaction members have gear teeth around their outer peripheries and the drive means for the reaction members comprises a reversible gear drive mechanism engageable with said gear teeth.

11. A tiltable mounting as claimed in claim 4, wherein the annular reaction members have gear teeth around their outer peripheries and the drive means for the reaction members comprises a reversible gear drive mechanism.

* * * * *

UNITED STATES PATENT AND TRADEMARK OFFICE
CERTIFICATE OF CORRECTION

PATENT NO. : 5,605,101
DATED : February 25, 1997
INVENTOR(S) : LINDSAY, Richard A.

It is certified that error appears in the above-identified patent and that said Letters Patent is hereby corrected as shown below:

Column 2, lines 48-51, delete the following:

$$\text{Total torque} = T_1 + T_2 \frac{MR}{2} (\sin(\theta + \alpha) + (\theta + \beta))$$

$$= \frac{MR}{2} \cdot 2 \sin\left(\frac{2\theta + \alpha + \beta}{2}\right) \cos\left(\frac{2 - \beta}{2}\right)$$

and inserting therefor $$\text{Total torque} = T_1 + T_2 = \frac{MR}{2} (\sin(\theta + \alpha) + (\theta + \beta))$$

$$= \frac{MR}{2} \cdot 2 \sin\left(\frac{2\theta + \alpha + \beta}{2}\right) \cos\left(\frac{\alpha - \beta}{2}\right)$$

Signed and Sealed this

Twenty-fifth Day of May, 1999

Attest:

Q. TODD DICKINSON

*Attesting Officer*  *Acting Commissioner of Patents and Trademarks*